(12) United States Patent
Murakami et al.

(10) Patent No.: US 7,653,286 B2
(45) Date of Patent: Jan. 26, 2010

(54) FILE REPRODUCTION APPARATUS, FILE REPRODUCTION METHOD, FILE REPRODUCTION METHOD PROGRAM AND RECORDING MEDIUM FOR RECORDING FILE REPRODUCTION METHOD PROGRAM

(75) Inventors: Masaharu Murakami, Tokyo (JP); Shigeru Kashiwagi, Tokyo (JP); Haruo Yoshida, Kanagawa (JP); Hiroshi Jinno, Kanagawa (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 10/574,930

(22) PCT Filed: Oct. 7, 2004

(86) PCT No.: PCT/JP2004/015198

§ 371 (c)(1),
(2), (4) Date: Apr. 7, 2006

(87) PCT Pub. No.: WO2005/036876

PCT Pub. Date: Apr. 21, 2005

(65) Prior Publication Data

US 2007/0053658 A1    Mar. 8, 2007

(30) Foreign Application Priority Data

Oct. 10, 2003    (JP)    .............................. P2003-351844

(51) Int. Cl.
    *H04N 5/78*    (2006.01)
(52) U.S. Cl. ........................................ 386/95; 386/125
(58) Field of Classification Search .................... 386/95, 386/124–126

See application file for complete search history.

(56) References Cited

U.S. PATENT DOCUMENTS

2003/0188182 A1    10/2003    Sato et al.

FOREIGN PATENT DOCUMENTS

| JP | 2001-094933 | 4/2001 |
|----|-------------|--------|
| JP | 2001-320658 | 11/2001 |
| JP | 2002-197839 | 7/2002 |
| JP | 2003-114845 | * 4/2003 |
| JP | 2003-224817 | 8/2003 |
| JP | 2003-264800 | 9/2003 |
| JP | 2004-007533 | 1/2004 |

OTHER PUBLICATIONS

English Translation of an International Preliminary Examination Report, International Application No. PCT/JP2004/015198, dated Oct. 7, 2004.
International Search Report mailed Jan. 11, 2005.
International Written Opinion mailed Jan. 11, 2005.
Shigeyuki Sakazawa, "TCP Video Streaming no Doteki Rate Seigyo Hoshiki no Kento", The Institute of Electronics, Information and Communication Engineers Gijutsu Kenkyu Hokoku [Gazo Kogaku], Nov. 15, 2002, vol. 102, No. 469, IE2002-100, pp. 19-24.

* cited by examiner

*Primary Examiner*—David E Harvey
(74) *Attorney, Agent, or Firm*—Rader, Fishman & Grauer PLLC

(57) ABSTRACT

The present invention is applied to reproduction of typically a fragment movie file having a QT format. In accordance with the present invention, management information associated with each block following a first block of the fragment movie file is modified to information compatible with management information associated with the first block and real data of the file is reproduced on the basis of the modified management information.

9 Claims, 11 Drawing Sheets

FIG. 6

MOOF (moof)

tfhd

| | |
|---|---|
| BaseDataOffset | 26700 |
| SampleDescription ID | 1 |
| DefaultSampleSize | 0 |
| DefaultSampleDuration | 1000 |
| DefaultSyncSample | nosync | trun

| DataOffset | 0 | | | | | |
|---|---|---|---|---|---|---|
| | 1 | 2 | 3 | 4 | 5 | 6 |
| SampleSize | 5234 | 1953 | 2085 | 3231 | 2051 | 2131 |
| SampleDuration | none | none | none | none | none | none |
| SyncSample | sync | nosync | nosync | nosync | nosync | nosync |
| CompositionTime | 3000 | 0 | 0 | 3000 | 0 | 0 |

FIG. 7 stbl stsz SampleSize
5154
2087
1896
3209
2179
2056
5234
1953
2085
3231
2051
2131 stss SyncSample
1
7 ctts SampleCount CompositonTime
| | |
|---|---|
| 1 | 3000 |
| 2 | 0 |
| 1 | 3000 |
| 2 | 0 |
| 1 | 3000 |
| 2 | 0 |
| 1 | 3000 |
| 2 | 0 | stco ChunkOffset
10000
26700 stts SampleCount SampleDuration
12   1000 stsc FirstChunk SamplePerChunk StsdID
1   6   1

F I G. 9
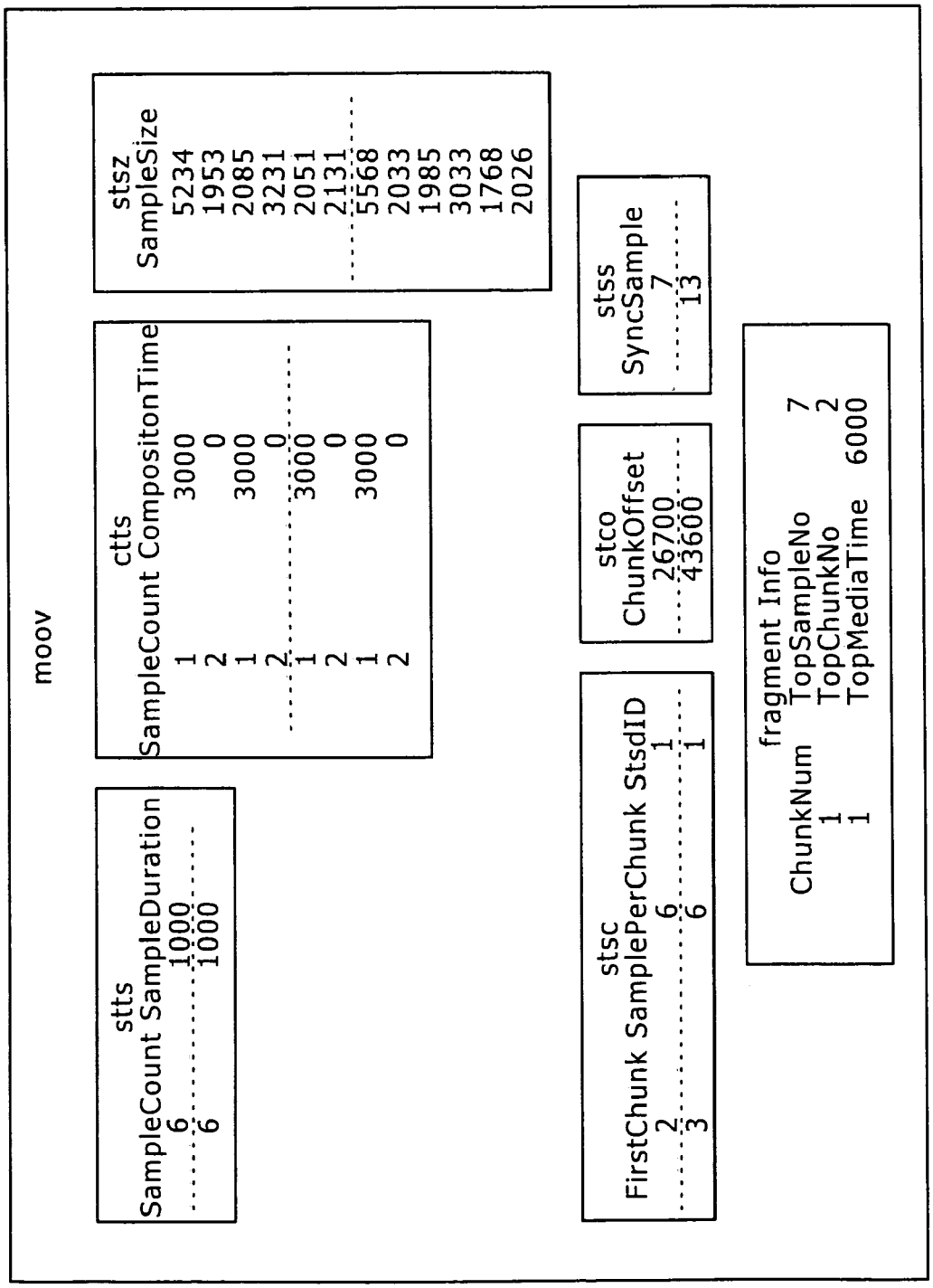

FILE REPRODUCTION APPARATUS, FILE REPRODUCTION METHOD, FILE REPRODUCTION METHOD PROGRAM AND RECORDING MEDIUM FOR RECORDING FILE REPRODUCTION METHOD PROGRAM

TECHNICAL FIELD

The present invention relates to file reproduction apparatus, a file reproduction method, a program implementing the file reproduction method and a recording medium for recording the program implementing the file reproduction method. For example, the present invention can be applied to reproduction of a fragment movie file conforming to an ISO base media file format (MPEG-4 part 12) taking a QT format as a base. The present invention is provided as means for reproducing real data of a fragment movie file by modifying management information set in each block following a head block of the fragment movie file to make the management information set in each following block compatible with the management information set in the head block. By making the management information set in each subsequent block compatible with the management information set in the head block, it is possible to simplify processing carried out to reproduce the fragment movie file or the like.

BACKGROUND ART

In the past, a quick-time file format (referred to hereafter simply as a QT format) was used in a broader range of applications as a file format for multimedia.

In accordance with the QT format, real data including moving pictures, still pictures and sound is divided into blocks. In addition, management information used for managing the real data is also divided into blocks separated from the blocks of the real data. In the following description, blocks of the management information and the real data are each referred to as an atom. Moreover, atoms of the real data and the management information are further divided into sub-blocks to form a hierarchical structure. In the case of the real data, a smallest management unit is referred to as a sample, and one sample or a plurality of samples forms a chunk, which is used as an upper-level management unit. Then, in the case of a file created from blocks as a file conforming to the QT format, considering convenience of processing, normally, one frame serving as a display unit or a GOP (Group of Pictures) is set in one sample as disclosed in a document such as Japanese Patent Laid-Open No. 2001-94933.

In general, a file having a QT format includes atoms of two different types, that is to say, a movie data atom of collected real data and a movie atom of collected management information.

By the way, in addition to the same recording method as the method for the QT format, a recording method for the so-called fragment movie format is applied as a recording method for the ISO base media file format (MPEG-4 part 12) taking the QT format as a base to apparatus with few resources and apparatus for which it is feared that the power supply thereof is down in the course of a recording process.

For the reason described above, the real data of an ISO base media file containing a fragment movie is segmented into a plurality of blocks each having a predetermined size in the progressing direction along the time axis as shown in FIG. 1. In the figure, the blocks of the real data are each shown as a block corresponding to one of a plurality of movie data atoms mdat0, mdat1, mdat2 and so on. In the following description, the ISO base media file is also referred to as a fragment movie file. The fragment movie file also includes a movie atom moov, associated with the movie data atom mdat0 serving as the first atom in the series of aforementioned movie data atoms mdat0, mdat1, mdat2 and so on. The movie atom moov has the same atom structure as the ordinary QT movie file. The movie atom moov is formed as an atom referring to the movie data atom mdat0 as shown by an uppermost arrow in the figure so as to allow video data allocated to the movie data atom mdat0 as real data to be reproduced. It is to be noted that the first movie data atom mdat0 is also known as an initial moov. Thus, in the following description, the first movie data atom mdat0 is also referred to as an initial moov atom.

In addition, the fragment movie file also includes an atom moof containing management information associated with each of the movie data atoms mdat1, mdat2 and so on. As shown in the figure, the atoms moof each containing management information are denoted by reference notations moof1, moof2 and so on. In the following description, the atoms moof1, moof2 and so on are each referred to as a moof atom. The moof atoms moof1, moof2 and so on are formed as atoms referring to their respective movie data atoms mdat1, mdat2 and so on respectively as shown by subsequent arrows in the figure so as to allow pieces of video data allocated to the movie data atoms mdat1, mdat2 and so on as pieces of real data to be reproduced.

Thus, while the movie data atoms mdat0, mdat1, mdat2 and so on are being stored sequentially in a created fragment movie file in a recording process, the initial moov atom associated with mdat0 as well as the moof atoms moof1, moof2 and so on associated with the movie data atoms mdat1, mdat2 and so on respectively are also stored on the created file sequentially as well. Thus, even an apparatus having few resources is capable of recording a fragment movie file with a large size onto a recording medium. In addition, even if the power supply thereof is down in the course of a recording process, video data up to a portion corresponding to the down event can be recorded in a reproducible state onto the recording medium.

In addition, in a fragment movie file, the initial moov atom has a structure of management information associated with the video data of the movie data atom mdat0. The management information set in the initial moov is set for chunks of the movie data atom mdat0 and samples of each of the chunks. The chunks and samples are each used as a management unit of real data much like the movie atom of the ordinary QT movie file. On the other hand, the moof atoms moof1, moof2 and so on are each provided with a structure different from the initial moov atom with an objective to reduce the amount of management information accommodated in the moof atom. That is to say, with every default setting in each of the moof atoms moof1, moof2 and so on as a reference, the moof atoms moof1, moof2 and so on can each have a structure of condensed set management information related to the movie data atoms mdat1, mdat2 and so on respectively for each sample.

Thus, in processing to reproduce a fragment movie file, it is necessary to switch the reproduction processing from the initial moov atom to one of the moof atoms moof1, moof2 and so on. As a result, the fragment movie file raises a problem of complicated processing carried out at a reproduction time.

DISCLOSURE OF INVENTION

It is thus an object of the present invention addressing the problems described above to provide a file reproduction apparatus and a file reproduction method, which are capable of simplifying processing carried out to reproduce a fragment movie file, as well as provide a program implementing the file reproduction method and a recording medium used for recording the program implementing the file reproduction method.

The file reproduction apparatus to which the present invention is applied for solving the problems is an apparatus for reproducing a file from a recording medium by modification of management information associated with each block following a head block of the file to information settings compatible with management information associated with the head block and reproduction of real data of the file on the basis of the modified management information.

In accordance with the above configuration of the present invention, the present invention is applied to the file reproduction apparatus for reproducing a file recorded on a recording medium by modification of management information associated with each block following a head block of the file to information settings compatible with management information compatible with the head block and reproduction of real data of the file on the basis of the modified management information so that, in a process to reproduce the real data of the file, the real data can be reproduced by carrying out a reproduction operation based on the management information associated with the head block and a reproduction operation based on the management information associated with each of the blocks following the head block in the same processing. As a result, the processing to reproduce a fragment movie file or the like can be made simple.

In addition, the file reproduction method to which the present invention is applied is a method for reproducing a file from a recording medium by modification of management information associated with each block following a head block of the file to information settings compatible with management information associated with the head block and reproduction of real data of the file on the basis of the modified management information.

As a result, in accordance with the above configuration of the present invention, it is possible to provide a file reproduction method capable of simplifying the processing to reproduce a fragment movie file or the like.

In addition, the program to which the present invention is applied is a program implementing a file reproduction method for reproducing a file from a recording medium by execution of a predetermined processing procedure including the steps of modifying management information associated with each block following a head block of the file to information settings compatible with management information associated with the head block and reproducing real data of the file on the basis of the modified management information.

As a result, in accordance with the above configuration of the present invention, it is possible to provide a program implementing a file reproduction method capable of simplifying the processing to reproduce a fragment movie file or the like.

In addition, the recording medium to which the present invention is applied is a recording medium used for recording a program implementing a file reproduction method for reproducing a file from a recording medium by execution of a predetermined processing procedure including the steps of modifying management information associated with each block following a head block of the file to information settings compatible with management information associated with the head block and reproducing real data of the file on the basis of the modified management information.

As a result, in accordance with the above configuration of the present invention, it is possible to provide a recording medium used for recording a program implementing a file reproduction method capable of simplifying the processing to reproduce a fragment movie file or the like.

In accordance with the present invention, it is possible to simplify processing carried out to reproduce a fragment movie file or the like.

BRIEF DESCRIPTION OF DRAWINGS

FIG. 6 is a table showing typical concrete numerical settings of the sample information shown in FIG. 5;

FIG. 7 is a table referred to in explanation of concrete processing of the sample information shown in FIG. 5;

FIG. 9 is a table referred to in explanation of content changes caused by switching of processing from a block to another as content changes from the table shown in FIG. 7;

BEST MODE FOR CARRYING OUT THE INVENTION

Embodiments of the present invention are explained in detail by referring to diagrams as follows.

Figure 2:
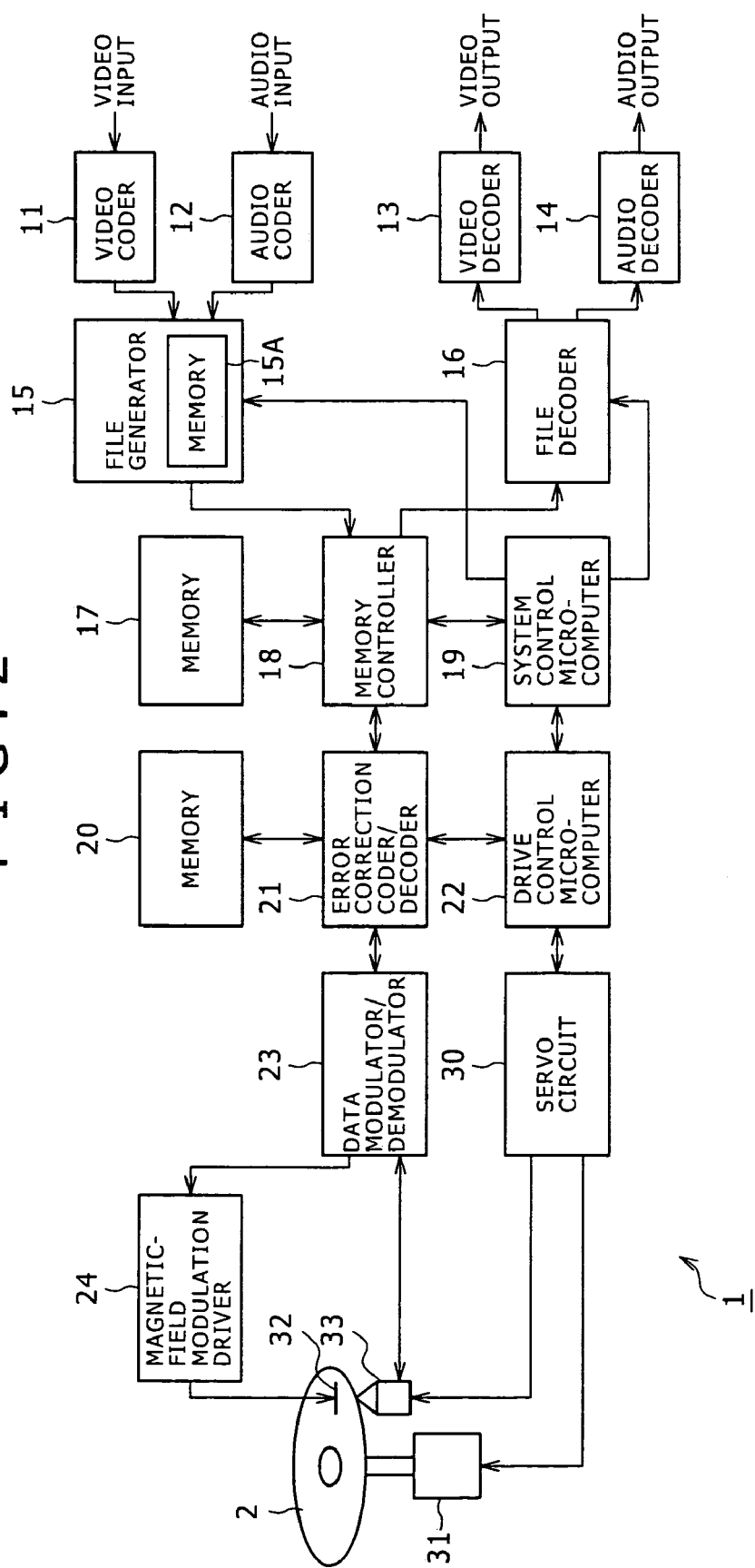
FIG. 2 is a block diagram showing a video-disc apparatus according to a first embodiment of the present invention.

(1) Configuration of the Embodiments (1-1) Overall Configuration of a Video-Disc Apparatus FIG. 2 is a block diagram showing a video-disc apparatus according to an embodiment of the present invention. In this video-disc apparatus 1, image pickup means not shown in the figure takes a video signal of an image pickup object and audio acquisition means also not shown in the figure takes an audio signal of the object. Then, an image pickup result represented by the video and audio signals is recorded onto an optical disk 2. In addition, an image pickup result recorded on the optical disk 2 is reproduced and output to display means for displaying the result on a liquid-crystal display panel, output to a speaker serving as audio output means and output to an external apparatus. The image pickup result shown to the user in this way can be edited by the user in an editing process.

In the video-disc apparatus 1, an image pickup result represented by video and audio signals is compressed in a data compression process conforming to an MPEG format before being recorded onto the optical disk 2 in an MPEG format. As the file format, this embodiment adopts the format of a fragment movie conforming to the ISO base media file format taking the QT format as a base.

Thus, in the video-disc apparatus 1, a video coder 11 carries out an analog/digital conversion process on the video signal of the result of image pickup in order to generate video data. Then, the video coder 11 carries out an encoding process conforming to the MPEG format on the video data in order to generate an elementary stream of video data.

In the mean time, an audio coder 12 carries out an analog/digital conversion process on the audio signal of the result of image pickup in order to generate audio data. Then, the audio coder 12 carries out an encoding process conforming to the MPEG format on the audio data in order to generate an elementary stream of audio data.

At a recording time, a file generator 15 synchronizes and multiplexes the elementary streams generated by the video coder 11 and audio coder 12 in order to generate data of a fragment movie file under control executed by a system control microcomputer 19. To put it concretely, while multiplexing the sequentially received elementary streams in order to generate data of movie data atoms in predetermined block units, the file generator 15 additionally creates data required for generating the initial moov atom and moof atoms for the movie data atoms and holds the additionally created data in an embedded memory 15A. As the process to generate blocks of aforementioned movie data atoms to be recorded is completed, the file generator 15 creates a data array consisting of the initial moov and the moof atoms from the data held in the embedded memory 15A and outputs the array.

In accordance with control executed by a system control microcomputer 19, a memory controller 18 switches the operation thereof. At a recording time, the memory controller 18 sequentially records a fragment movie file output by the file generator 15 in a memory 17 and temporarily holds the file in the memory 17 before outputting the file temporarily held in the memory 17 to an error correction coder/decoder 21. The fragment movie file includes an array of movie data atoms or the like. At a reproduction time, on the other hand, the memory controller 18 temporarily holds data output by the error correction coder/decoder 21 before outputting the data to a file decoder 16 and the system control microcomputer 19.

In accordance with control executed by the system control microcomputer 19, the error correction coder/decoder 21 also switches the operation thereof. At a recording time, the error correction coder/decoder 21 temporarily records data output by the memory controller 18 in a memory 20 and adds error correction codes to the stored data. Then, the error correction coder/decoder 21 reads out the data held in the memory 20 in this way in a predetermined order in order to interleave the data before outputting the interleaved data to a data modulator/demodulator 23. At a reproduction time, on the other hand, the error correction coder/decoder 21 temporarily records data output by the data modulator/demodulator 23 into the memory 20 in a predetermined order opposite to the order predetermined for the recording operation before outputting the data to the memory controller 18. That is to say, the error correction coder/decoder 21 de-interleaves the data output by the data modulator/demodulator 23 and outputs the de-interleaved data to the memory controller 18. At that time, the error correction coder/decoder 21 also carries out an error correction process on the data received from the data modulator/demodulator 23 by using the error correction codes, which were added to the data at a recording time.

In accordance with control executed by the system control microcomputer 19, the data modulator/demodulator 23 also switches the operation thereof. At a recording time, the data modulator/demodulator 23 converts data output by the error correction coder/decoder 21 into a serial data array before modulating the array and outputting the modulated array to a magnetic-field modulation driver 24 or an optical pickup 33. At a reproduction time, on the other hand, the data modulator/demodulator 23 reproduces a clock signal from a reproduced signal output by the optical pickup 33. Then, by using the clock signal as a reference, the data modulator/demodulator 23 carries out a binary recognition process and a demodulation process on the reproduced signal in order to generate reproduced data of the serial data array, which was generated at a recording time. Subsequently, the data modulator/demodulator 23 outputs the reproduced data to the error correction coder/decoder 21.

In the case of a magneto-optical disk used as the optical disk 2, at a recording time, the magnetic-field modulation driver 24 drives a magnetic head 32 in accordance with a signal output by the data modulator/demodulator 23 under control executed by the system control microcomputer 19. The magnetic head 32 is held at a position sandwiching the optical disk 2 in conjunction with the position of the optical pickup 33, facing the optical pickup 33 through the optical disk 2. The magnetic head 32 applies a magnetic field modulated by data output by the data modulator/demodulator 23 to a position radiated by a laser beam generated by the optical pickup 33. Thus, in the case of a magneto-optical disk used in the video-disc apparatus 1 as the optical disk 2, a thermomagnetic recording technique is adopted to record a result of image pickup onto the optical disk 2 as a fragment movie file.

In the case of this embodiment, the optical disk 2 is a recording medium having a shape resembling a disc. In this embodiment, the optical disk 2 is a programmable optical disc such as an MO (Magneto-Optical) disc or a disc of a phase-change type. A spindle motor 31 is a motor for driving the optical disk 2 into rotation in accordance with control executed by a servo circuit 30 under a condition determined by the type of the optical disk 2. Examples of the condition are a CLV (Constant Linear Velocity) condition, a CAV (Constant Angular Velocity) condition and a ZCLV (Zone Constant Linear Velocity) condition.

On the basis of a variety of signals output from the optical pickup 33, the servo circuit 30 controls the operation of the spindle motor 31 in order to execute a spindle control process. The servo circuit 30 also executes tracking control and focus control of the optical pickup 33. In addition, the servo circuit 30 also moves the optical pickup 33 and the magnetic head 32 in a seek operation in order to search for a focus or carry out another process.

A drive control microcomputer 22 is a component for controlling the servo circuit 30 to carry out operations such as the seek operation mentioned above in accordance with a command given by the system control microcomputer 19.

The optical pickup 33 is a component for radiating a laser beam to the optical disk 2 and having a predetermined light reception device for receiving the laser beam reflected by the optical disk 2. The optical pickup 33 then processes a result of the light reception in order to generate a variety of output control signals and output a reproduced signal with a signal level thereof varying in accordance with a pit array and a mark array, which have been created on the optical disk 2. In addition, in accordance with control executed by the system control microcomputer 19, the optical pickup 33 switches its operation. In the case of a magneto-optical disk used as the optical disk 2, at a recording time, the optical pickup 33 intermittently builds up the optical quantity of the laser beam radiated to the optical disk 2. Thus, in the video-disc apparatus 1, the so-called pulse-train technique is adopted to record a result of image pickup onto the optical disk 2. In the case of a phase-change disk or the like used as the optical disk 2, on the other hand, the optical pickup 33 builds up the optical quantity of the laser beam radiated to the optical disk 2 from a reproduction-time optical quantity to a recording-time one in accordance with data output by the data modulator/demodulator 23. Thus, in this case, a thermal recording technique is adopted to record a result of image pickup onto the optical disk 2.

In the operations carried out in the video-disc apparatus 1 as described above, the video coder 11 codes a video signal representing a result of image pickup in order to compress the signal and convert the compressed signal into a video elementary stream. By the same token, the audio coder 12 codes an audio signal representing the result of image pickup in order to compress the signal and convert the compressed signal into an audio elementary stream. Then, the file generator 15 converts the video elementary stream and the audio elementary stream into a data array of a fragment movie file. Subsequently, the file generator 15 supplies the data array of the fragment movie file to the optical pickup 33 or the optical pickup 33 as well as the magnetic head 32 by way of the memory controller 18, the error correction coder/decoder 21 and the data modulator/demodulator 23, which sequentially process the data array. Finally, the data array of the fragment movie file is recorded onto the optical disk 2.

In a reproduction process, on the other hand, in the video-disc apparatus 1, the data modulator/demodulator 23 processes a reproduced signal obtained from the optical pickup 33 in order to generate reproduced data. Then, the error correction coder/decoder 21 processes the reproduced data in order to reproduce a fragment movie file recorded on the optical disk 2. Subsequently, the memory controller 18 outputs the data of the fragment movie file.

The file decoder 16 receives the data of the fragment movie file from the memory controller 18, splitting the data into an elementary stream of video data and an elementary stream of audio data as outputs. In the processing carried out to generate the elementary stream of video data and the elementary stream, the file decoder 16 acquires management information set in an initial moov atom and management information set in moof atoms, outputting the pieces of aforementioned management information to the system control microcomputer 19 in accordance with seek and other control executed by the system control microcomputer 19. Then, the system control microcomputer 19 executes control based on the management information set in the initial moov atom and based on the data of the moof atoms, driving the file decoder 16 to generate the elementary stream of video data and the elementary stream of audio data on the basis of these pieces of management control.

A video decoder 13 is a section for carrying out a data decompression process on the video-data elementary stream received from the file decoder 16 and outputs a result of the process to display means and an external apparatus, which are not shown in the figure. By the same token, an audio decoder 14 is a section for carrying out a data decompression process on the audio-data elementary stream received from the file decoder 16 and outputs a result of the process to audio output means and an external apparatus, which are not shown in the figure. In this way, the video-disc apparatus 1 generates an image pickup result reproduced from the optical disk 2 as output signals that can be monitored.

The system control microcomputer 19 is a microcomputer for controlling operations of the whole video-disc apparatus 1. By execution of predetermined processing programs stored in a memory not shown in the figure, the system control microcomputer 19 controls the operation of every section employed in the video-disc apparatus 1 in accordance with an operation carried out by the user. Thus, the system control microcomputer 19 records a result of image pickup on the optical disk 2, reproduces a result of image pickup from the optical disk 2 in order to present the result to the user and further carries out an edit process.

It is to be noted that processing programs to be executed by the system control microcomputer 19 are installed in advance in this video-disc apparatus 1. Instead of providing the processing programs to the user by installation of processing programs in advance, however, the programs can be presented to the user by recording them on another recording medium. By the way, as the other recording medium used for recording processing programs to be provided to the user, it is possible to use one of a wide variety of recording mediums including an optical disc, a magnetic disk, a memory card and a magnetic tape.

(1-2) Fragment Movie Files

Figure 3:
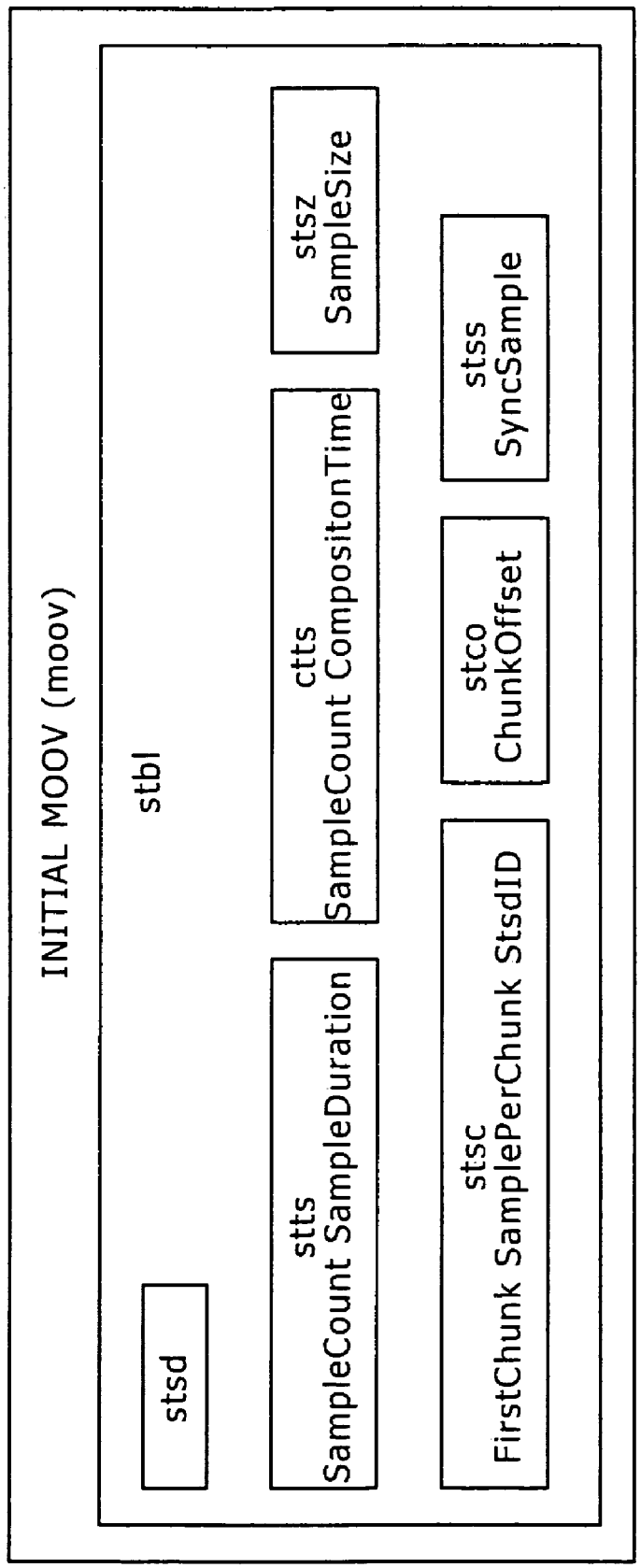
FIG. 3 is a table referred to in explanation of sample information of an initial moov atom in a fragment movie file.

FIG. 3 is a conceptual diagram showing a basic configuration of pieces of sample information provided in the initial moov atom of a fragment movie file. These pieces of sample information are each management information used for controlling movie data atoms of the fragment movie file. It is to be noted that, in the following description, each atom of a QT movie file is properly denoted by a type name set in the atom as a type name written in alphabetical letters.

The fragment movie format is one of formats taking the format of the QT movie file as a base. The QT format is a file format created as an extension function, which is provided to an OS (Operating System) as extension function for reproducing moving pictures and the like without using special hardware. The format of the QT movie file is a time-base multimedia file format usable for reproducing real data which has a variety of forms including moving pictures, sounds, still-pictures, characters and MIDI by synchronization of the forms along one time axis. The format of the QT movie file can also be adapted to streaming through a network.

Much like the ordinary QT movie file, in a fragment movie file, real data including a variety of forms is stored in movie data atoms as individual tracks.

Figure 1:
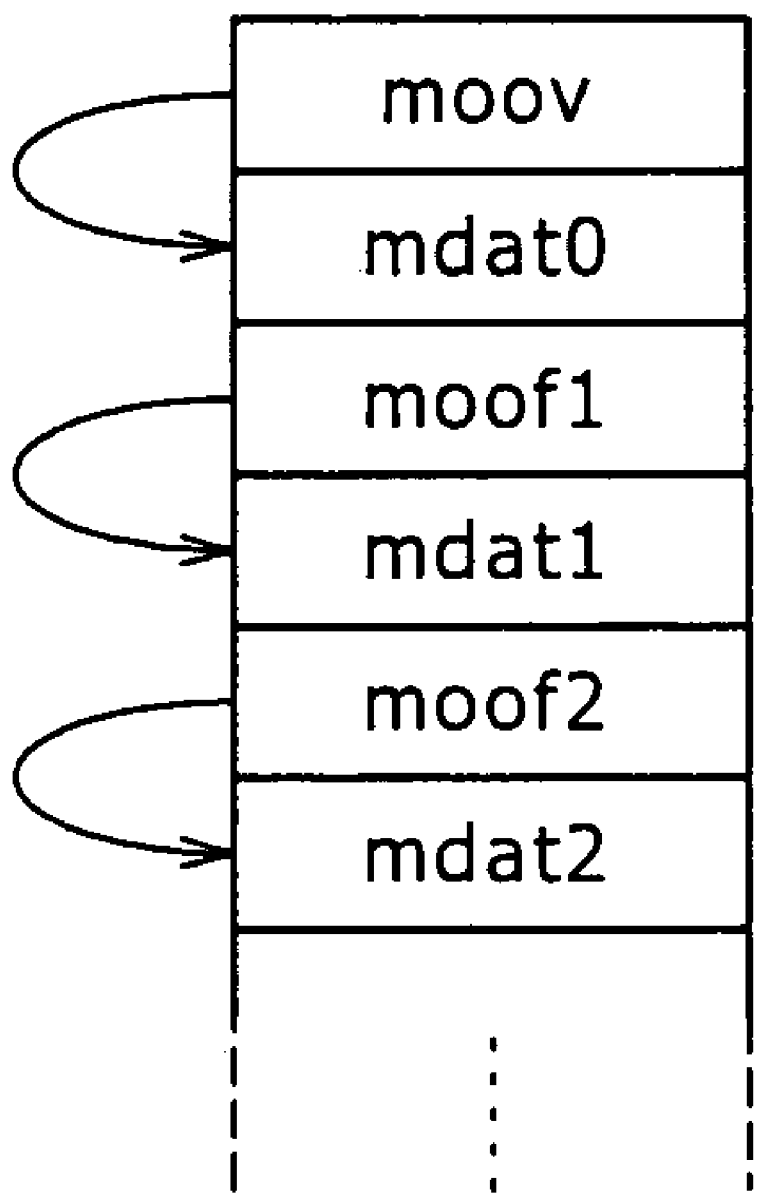
FIG. 1 is an explanatory diagram showing a fragment movie file in a simple manner.

As shown in FIG. 1, in a fragment movie file, a set of tracks containing real data is divided into blocks arranged along the time axis. Each of the blocks forms a movie data atom. Management information is assigned to each of the movie data atoms each serving as a block unit. The atom of management information for the head block is the initial moov atom. Management information provided for subsequent blocks following the head block is set in moof atoms each associated with one of the subsequent blocks. It is to be noted that an atom is also referred to as a box in some cases. A movie data atom is an atom with type name mdat. A movie data atom is also referred to as media data atom.

The initial moov atom is configured to form a hierarchical structure, in which management information is divided into boxes each associated with an attribute, in the same way as the movie atom in the ordinary QT format. That is to say, the initial moov atom has a structure including a movie header atom used for accommodating header information and track atoms used for holding management information for a track corresponding to a movie data atom. The track atoms form an stbl atom.

Pieces of management information on samples are set in the stbl atom. The stbl atom includes an stts atom, a ctts atom, an stsz atom, an stsc atom, an stco atom, an stss atom and an stsd atom.

The stts atom is an atom used for describing a relation between samples and the length of a time period of a decoding process. The length of the time period is expressed in terms of frames. To put it concretely, the stts atom describes a sample duration and a sample count. The sample duration is the display time of each sample. The sample count is the number of samples each displayed during the sample duration. In an example shown in FIG. 4, the stts atom describes that each of six samples assigned to the movie data atom associated with the initial moov atom is displayed during a period of 1,000 units of a time scale defined separately. It is to be noted that, an atom showing concrete values is explained on the assumption that a block of a movie data atom includes only one chunk. The explanation based on this assumption also applies to the example shown in FIG. 4.

The ctts atom is an atom used for describing composition times, which are each information on time related to a display of a picture, due to the fact that there is a picture, the position of which in the order of a stream obtained as a result of a data compression process is different from its position in the order on the display. That is to say, in the case of the example shown in FIG. 4, for the first one sample, the ctts atom describes that decoded video data is delayed by a period of 3,000 units of a time scale defined separately before being output. For the next two samples, the ctts atom describes that decoded video data is output without being delayed at all. For the one sample following the two samples, the ctts atom describes that decoded video data is delayed and then output in the same way as the first one sample. For the last two samples, the ctts atom describes that decoded video data is output without being delayed at all.

The stsz atom is an atom used for describing sample sizes, which are each the size of a sample. In the case of the example shown in FIG. 4, in the configuration of the samples, the first sample has a size of 5,154 bytes and a sample following the first sample has a size of 2,087 bytes.

The stsc atom is an atom used for describing a relation between each chunk and samples composing the chunk. It is to be noted that, in this case, a chunk is a block assigned to a movie data atom as a block resulting from a blocking process carried out on real data. A chunk is created from one sample or a plurality of samples. The stsc atom describes information including the number of the first chunk allocated to the movie data atom associated with the initial moov atom, the number of samples in each chunk and an Stsd ID (sample description index) used for identifying information recorded in the stsd atom as information on a decoding process. The stsd atom holds information on a decoding process. An example of the information on a decoding process is a data compression method. In the example shown in FIG. 4, the number of the first chunk allocated to the movie data atom associated with the initial moov atom is one, six samples are assigned to a chunk and the decoding process adopts the first decoding method described in the stsd atom.

The stco atom is an atom used for describing a chunk offset, which is information on the position of the head chunk in the file. The position in the file is a position with the beginning of the file taken as a reference. In the case of the example shown in FIG. 4, the stco atom describes that the first chunk of the movie data atom associated with the initial moov atom including the stco atom starts at an offset of 1,000 bytes from the beginning of the fragment movie file.

The stss atom is an atom used for describing a sync sample, which is information identifying which sample is a random-accessible sample. In this embodiment, the stss atom describes information on the position of an I picture. In the case of the example shown in FIG. 4, the stss atom indicates that the first sample is an I picture.

Figure 5:
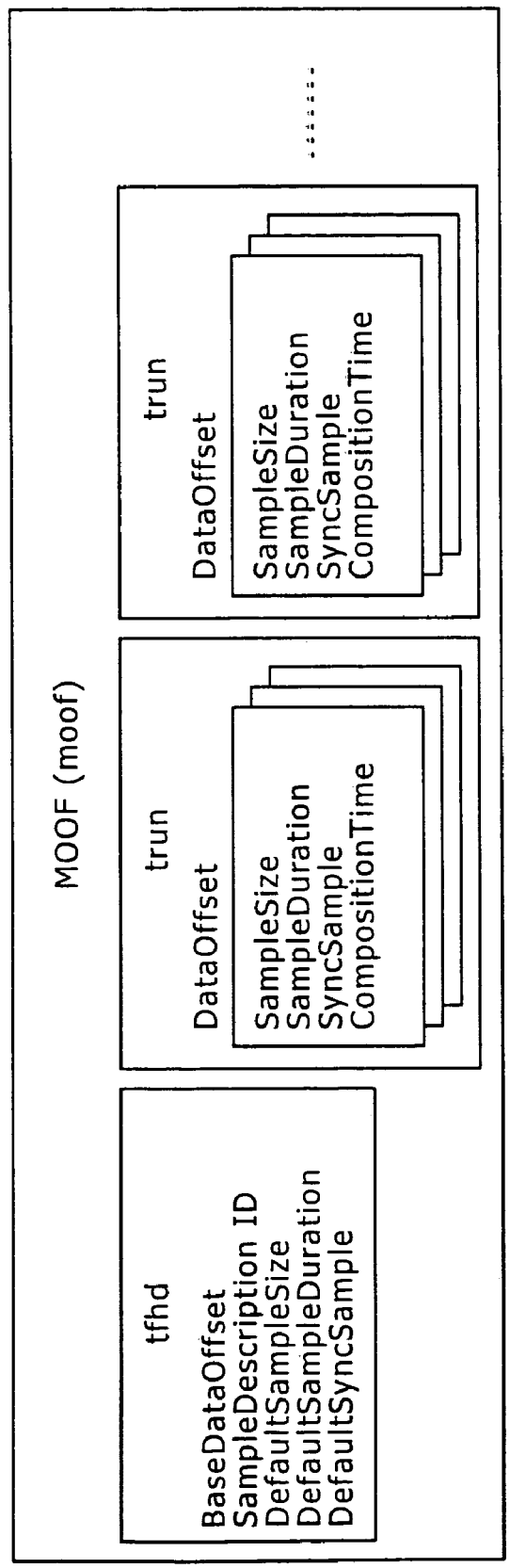
FIG. 5 is a table referred to in explanation of sample information of a moof atom in a fragment movie file.

FIG. 5 is a table referred to in explanation of sample information of a moof atom. The sample information shown in this figure is the sample information of a moof atom following the initial moov atom, the sample information of which is shown in FIG. 3. A moof atom includes a tfhd atom and a plurality of trun atoms. The tfhd atom of a moof atom is a head atom in which default values of the moof atom are set. It is possible to carry out processing on the basis of the default values set in the tfhd atom of the moof atom without management information set in the subsequent trun atoms. Thus, the amount of data can be compressed in a process to create a fragment movie file.

Information set in the tfhd atom as the default values includes a base data offset and a sample description ID. The base data offset corresponds to the aforementioned chunk offset, which is position information set in the stco atom of the initial moov atom. On the other hand, the sample description ID corresponds to the stsd ID set in the stsc atom of the initial moov atom as an ID used for identifying information on the decoding process. The base data offset serving as information on a position is the distance from the beginning of the file to the beginning of a movie data atom associated with the moof atom. In a numerical example shown in FIG. 6, the base data offset is set at 26,700 bytes. In addition, the example shown in FIG. 6 is used for recording a sample description ID of one revealing the fact that the decoding process adopts the first decoding method recorded in the stsd atom, which serves as a sample description atom of the initial moov atom.

On top of that, the tfhd atom also includes: a default sample size corresponding to the sample size set in the stsz atom of the initial moov atom; a default sample duration corresponding to the sample duration set in the stts atom of the initial moov atom; a default sync sample corresponding to the sync sample set in the stss atom of the initial moov atom as information used for identifying which sample is a random-accessible sample set in the stss atom. In addition, in the example shown in FIG. 6, the default sample size serving as the default value of the size of the sample is set at 0. The default sample duration serving as the default display time of one sample is set at 1,000 units of a time scale defined separately. The default sync sample serving as information used for identifying which sample is a random-accessible sample is set at a value of 'nosync' meaning that there is no random-accessible sample.

Even though the trun atom is generally provided as an atom associated with a chunk, the trun atom does not necessarily have to be associated with a chunk. In the case of a trun atom not associated with a chunk, a base data offset set in the trun atom as information on the position of the head chunk associated with the trun atom has a value other than 0. In the case of this embodiment, however, the trun atom is provided as an atom associated with a chunk. The data offset set in such a trun atom is information on the position of a chunk associated with the trun atom. The data offset set in the trun atom is a value taking the base data offset, which is set in the tfhd as information on a position, as a reference. Since the trun atom in the example shown in FIG. 6 is an atom for the head chunk associated with this moof atom, the data offset included in the trun atom as information on a position is set at 0.

In addition to the data offset, the trun atom includes a table set provided for samples. For each of the samples, the table shows pieces of information consisting of a sample size, a sample duration and a sync sample indicating whether or not the sample is a random-accessible sample, which correspond to respectively the default sample size, sample duration and sync sample set in the tfhd atom. On top of that, the information shown by the table also includes a composition time as information on the same display time as that of the initial moov atom. Thus, in the example shown in FIG. 6, a table showing information on six samples is created in the trun atom. The table includes the size of each sample. The size of a sample is value taking the default sample size as a reference. Each sample is displayed during a 'none' sample duration, which is the default sample duration of 1,000 units. The table also reveals the fact that only the first sample at the left end of the table is a random-accessible sample. The table also shows that only the first and fourth samples have a composition time of 3,000 units to indicate that, for each of these samples, the output of a decoding process is delayed by the composition time.

As described above, in the case of the fragment movie file, every moof atom includes information on the position of each of chunks associated with the moof atom, the size of each of samples included in every chunk, the display time of each sample and identification information provided for each sample as information used for indicating whether or not the sample is a random-accessible sample. The information on the position of each chunk, the size of each sample, the display time of each sample and the identification information are each set in the moof atom as a relative setting, which takes a standard setting set for the block associated with the moof atom as a reference. On the other hand, information set in the initial moov atom is settings corresponding to the standard settings set in each moof atom. It is thus necessary to reproduce real data by switching processing from the initial moov atom to a moof atom. The need to switch the processing complicates a process to reproduce a fragment movie file.

(1-3) Processing of the System Control Microcomputer

The system control microcomputer 19 controls whole operations so as to assign coded data of a frame to a sample, set a chunk from a predetermined number of samples and create a movie data atom from a plurality of chunks. Subsequently, the system control microcomputer 19 controls whole operations so that, for these movie data atoms, an initial moov atom and moof atoms are created as management-information atoms with the formats shown in FIGS. 3 to 6 and these movie data atoms and management-information atoms are then recorded sequentially onto the optical disk 2. As a result, the result of image pickup is recorded onto the optical disk 2 as a fragment movie file. It is to be noted that audio data is also allocated to movie data atoms each corresponding to an audio track. Then, for these movie data atoms, an initial moov atom and moof atoms are created as management-information atoms also corresponding to an audio track.

In a process to reproduce a fragment movie file of a recorded image pickup result from the recording medium 2, on the other hand, the system control microcomputer 19 modifies management information set in moof atoms obtained as a result of reproduction from the optical disk 2 to records compatible with the initial moov atom and stores the modified management information in an embedded memory. Then, in accordance with the records stored in the embedded memory, movie data atoms are reproduced from the optical disk 2.

Figure 4:
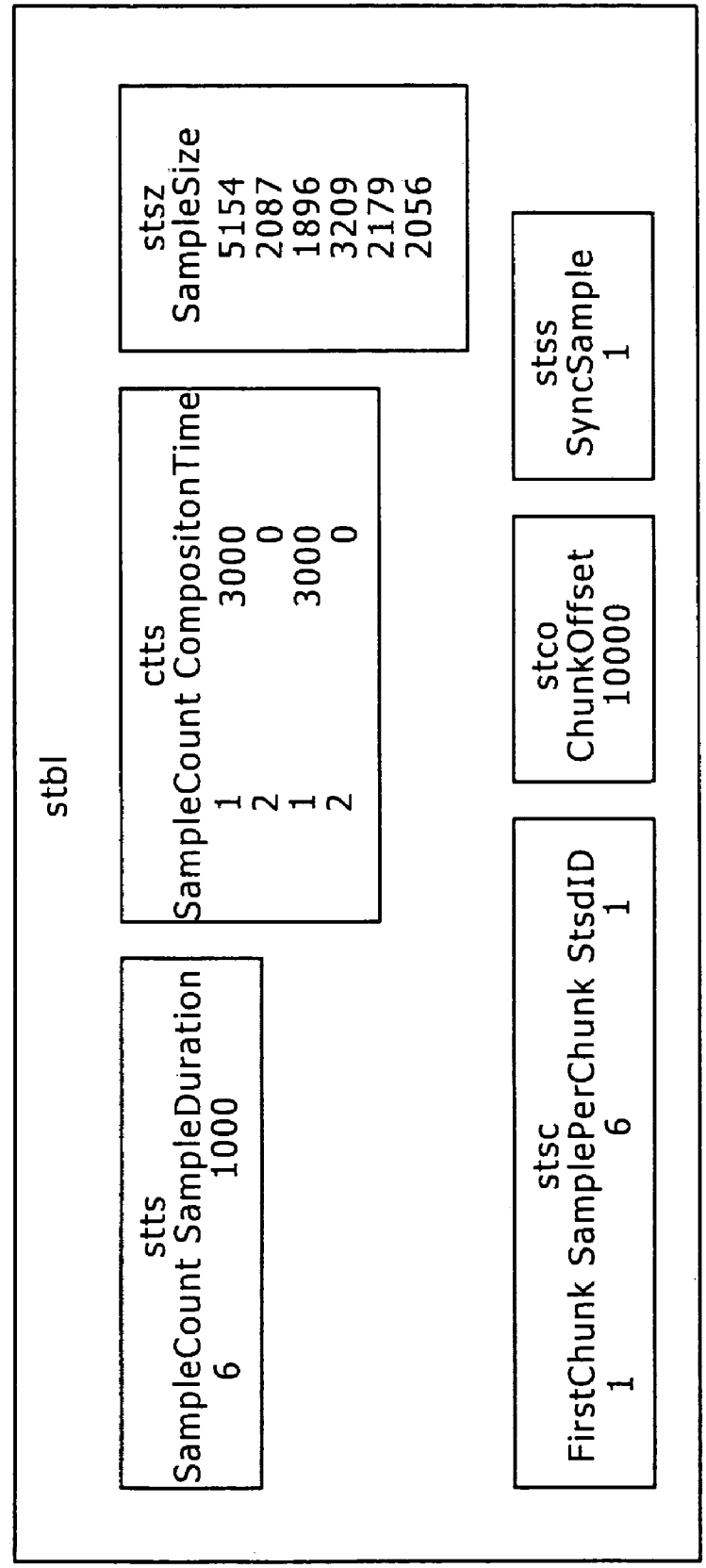
FIG. 4 is a table showing typical concrete numerical settings of the sample information shown in FIG. 3.

FIG. 7 is a table referred in comparison with the table shown in FIG. 4 in explanation of processing to modify management information set in a moof atom shown in FIG. 6. In actuality, the system control microcomputer 19 holds management information detected from the initial moov atom as management information necessary for a variety of reproduction processes in a tabular format in the embedded memory. Then, the system control microcomputer 19 modifies management information held in the embedded memory to management information compatible with the management information set in the initial moov atom also held in the embedded memory in the tabular format and adds the modified management information to the management information set in the initial moov atom, storing a result of the addition in the memory. After all, this processing is processing to modify management information set in every moof atom to management information compatible with the initial moov atom. For this reason, in the following description, management information set in the initial moov atom explained earlier by referring to FIG. 3 is referred to. Concrete values set in the initial moov atom and a moof atom are explained by referring to setting shown in FIGS. 4 and 6 respectively.

To put it concretely, the system control microcomputer 19 carries out processing to transform management information set in a moof atom from relative values into absolute values as follow. First of all, the system control microcomputer 19 modifies management-information values set for the moof atom as relative values taking the default management-information values of the initial moov atom as references to absolute management-information values not taking the default management-information values as references. The system control microcomputer 19 then stores the absolute management-information values obtained a result of the modification into the embedded memory as values compatible with the default management-information values of the initial moov atom.

That is to say, in the example shown in FIG. 4, the stts atom of the initial moov atom shows a sample duration of 1,000 for each of six samples. In the example shown in FIG. 6, on the other hand, the tfhd atom of the moof atom includes a default sample duration of 1,000 for a sample. The table of the first trun atom shows that the sample duration of each of the six samples has a value of 'none' indicating that the default sample duration is adopted. The values of moof atom set in the first trun atom are modified to values compatible with the values set in the initial moov atom and added to the table set in the initial moov atom to give a result shown in FIG. 7. As shown in the figure, the stts atom shows a sample duration of 1,000 for each of 12 samples. The values included in the stts atom of the initial moov atom shown in the figure are a result of the processing carried out by the system control microcomputer 19 to modify the values set in the table of the trun atom as values based on the default sample duration set in the tfhd atom and add the modified values to the stts atom. The stts atom includes a sample count and a sample duration.

On the other hand, the ctts atom of the initial moov atom shown in FIG. 4 shows an array of composition times starting with the composition time of the first sample to be followed sequentially by those of the subsequent samples. As for the moof atom shown in FIG. 6, the first trun atom shows composition times of 3000, 0, 0, 3000, 0 and 0 for six samples respectively. These composition times are added to the ctts table as sample counts of 1, 2, 1 and 2 associated with composition times of 3000, 0, 3000 and 0 respectively. In this way, the system control microcomputer 19 adds composition times recorded in the table of the trun atom.

As shown in FIG. 6, sample sizes include a default sample size of 0 in the tfhd atom of the moof atom and sample sizes recorded in the table of the trun atom of the moof atom in a way compatible with the sample sizes recorded in the initial moov atom shown in FIG. 4. Thus, in this case, the system control microcomputer 19 adds the sample sizes recorded in the table of the trun atom of the moof atom.

The stsc atom shown in FIG. 4 includes a first chunk of 1, a sample per chunk of 6 and an stsd ID of 1. The first chunk is a number assigned to the first chunk. The samples per chunk is the number of samples composing each chunk. The stsd ID is an ID used for identifying information on a decoding process. As shown in FIG. 6, on the other hand, the tfhd atom of the moof atom includes a sample description ID of 1 as an ID used for identifying information on a decoding process. In addition, the trun atom indicates six sets of information for six samples included in a chunk associated with the trun atom. Thus, the stsd atom is held as it is without adding any information to the atom. In this case, however, if the type of the decoding process is modified in the course of the process, that is, if the number of samples composing a chunk changes, for example, the system control microcomputer 19 changes the stsd atom by setting the chunk number of the new chunk in the first-chunk number, the number of samples in the samples per chunk and a new ID in the stsd ID used for identifying information on a decoding process.

In the example shown in FIG. 4, the chunk offset, which is information on the position of the first chunk, is set at 10,000 bytes. In the example shown in FIG. 6, on the other hand, the base data offset in the tfhd atom is set at 26,700 bytes and, in the first trun atom, the data offset is set at 0 byte. Thus, a chunk offset of 26,700 bytes is added to the stco atom. The chunk offset added to the stco atom is the sum of the aforementioned base data offset of 26,700 bytes in the tfhd atom and the aforementioned data offset of 0 byte in the first trun atom.

The stss atom in the example shown in FIG. 4 describes a sync sample, which is information indicating that the head sample is a random-accessible sample. While six samples are assigned to this initial moov atom, the table of the following first trun atom includes a sync sample only for the first sample to indicate that only the first sample is a random-accessible sample as shown in FIG. 6. For this reason, information indicating that the seventh sample is a random-accessible sample is added to the stss atom. That is to say, in this case, the system control microcomputer 19 adds the number of the random-accessible sample to the stss atom on the basis of the sync sample information recorded in the trun atom.

In order to carry out the addition processes described above, the system control microcomputer 19 must modify settings of each moof atom serving as management information set in the following block to settings compatible with the initial moov atom, which is the management information set in the head block.

When the user enters an instruction to start a process to reproduce a result of image pickup, the system control microcomputer 19 issues a command to start a process to reproduce a fragment movie file of the result of image pickup. In this case, the initial moov atom of the fragment movie file is reproduced from the optical disk 2 and held in an embedded memory. Then, on the basis of the initial moov atom held in the embedded memory, the corresponding movie data-atom are reproduced from the optical disk 2 to be presented to the user. During a free time period in an access to the optical disk 2 to reproduce the movie data atom, the following moof atom is reproduced from the optical disk 2. Finally, management information recorded in each of the moof atoms is modified to settings compatible with the initial moov atom and added to the settings of the initial moov atom to produce new settings, which are also stored in the embedded memory.

The system control microcomputer 19 concurrently carries out the process to reproduce the movie data atom, the process to reproduce moof atoms, the process to modify management information recorded in each of the moof atoms to settings compatible with the initial moov atom and the process to add the modified management information to the settings of the initial moov atom in order to produce new settings. In this way, while reproducing the fragment movie file, the system control microcomputer 19 modifies all moof atoms provided in the fragment movie file to settings compatible the initial moov atom, adds the modified management information to the settings of the initial moov atom in order to produce new settings and stores the new settings in the embedded memory.

Thus, the system control microcomputer 19 bears a heavier processing load only temporarily. This is because any subsequent process to reproduce the same fragment movie file and a process to reproduce the fragment movie file between an operation to modify settings of all moof atoms and an operation to store the modified settings in an embedded memory (that is, a process to reproduce real data left in the fragment movie file as real data associated with a range of the stored modified settings) can be carried out without switching the processing from the initial moov atom to a moof atom. The elimination of the need to switch the processing simplifies the process to reproduce the fragment movie file.

That is to say, in the same way as the process to reproduce an ordinary QT movie file, on the basis of modified management information set in moof atoms stored in the embedded memory as a result of a process to modify the management information to settings compatible with the initial moov atom as described above, the system control microcomputer 19 sequentially reproduces samples associated with management information set in the moof atoms in a process to reproduce a fragment movie file containing the samples in a direction along the time axis. In addition, in response to an operation carried out by the user, the identification information (referred to as sync sample) included in the management information stored in the embedded memory as described above as information identifying which sample is a random-accessible sample is used for selectively reproducing a sample included in a movie data atom as a sample containing real data. By selectively reproducing such a sample, the fragment movie file can be reproduced at a variable speed. In addition, a chunk offset included in the same management information as information on a position is used for detecting a reproduction time and a process to reproduce samples of movie data atoms is started at the detected reproduction time. By starting the process to reproduce samples of movie data atoms at a detected reproduction time, a process to reproduce the fragment movie file can be started at a reproduction time indicated by the position information (or the chunk offset).

If the storage capacity of the embedded memory is not large enough for storing the modified management information set in all moof atoms in the same format as the initial moov atom, a work area of the optical disk 2 is allocated to the modified management information to compensate the embedded memory for the insufficiency. In this case, the modified management information set in all moof atoms is acquired in the same format as the initial moov atom and temporarily stored in the work area allocated in the optical disk 2. As the process to reproduce the fragment movie file is ended, an absolute path pointing to movie data atoms of the fragment movie file is set. Then, movie atoms of an ordinary QT movie file are created as atoms containing the management information stored in the work area allocated in the optical disk 2 and recorded on the optical disk 2. In this way, a QT movie file having an external reference format can be created.

Then, a file name assigned to the QT movie file created as described above is set in the name of the fragment movie file reproduced so far and the extension of the new file name of the reproduced fragment movie file is modified to a file name extension indicating that the reproduced fragment movie file is a QT movie file. That is to say, the file name of the newly created QT movie file points to the fragment movie file indicated by the file name with a modified extension.

Thus, once the management information set in moof atoms has been modified to a format compatible with the initial moov atom, the system control microcomputer 19 is capable of effectively utilizing the modified management information included in the modified moof atoms to reproduce the fragment movie file in any subsequent process. In any subsequent process to reproduce the fragment movie file, the moof atoms no longer need to be modified. Instead, by carrying out the same process as a process to reproduce an ordinary QT movie file, movie data atoms of the fragment movie file can be reproduced.

(2) Operations of the Embodiment

In the video-disc apparatus 1 having the configuration described above, a video signal taken by the image pickup means is subjected to a data compression process carried out by the video coder 11 in order to convert the signal into coded data. The coded data is then supplied to the file generator 15. At the same time, an audio signal taken by the image pickup means is subjected to a data compression process carried out by the audio coder 12 in order to convert the signal into coded data. By the same token, the coded data is also supplied to the file generator 15. Then, the file generator 15 creates a sample including coded data of the video and audio signals for each frame of the video signal. The file generator 15 further creates a chunk from each plurality of aforementioned samples. The coded data is finally recorded onto the optical disk 2 by way of the memory controller 18, the error correction coder/decoder 21 and the data modulator/demodulator 23 in block units each composing a plurality of aforementioned chunks. In addition, while the block units each composing a plurality of aforementioned chunks are being recorded onto the optical disk 2, information including management information is obtained for each of the blocks as information used for reproducing the block units from the optical disk 2. The management information is used by the system control microcomputer 19 and the file generator 15 to create a data array composed of an initial moov atom and moof atoms. The data array is also recorded onto the optical disk 2 by the same recording system as the coded data.

Thus, in the video-disc apparatus 1, video data represented by the video signal, which is a signal of real data, is segmented into blocks each including a plurality of aforementioned chunks. Management information associated with each of blocks following the head block of the real data, that is, management information associated with each of blocks other than the head block, is stored in a moof atom. The management information stored in a moof atom associated with a block includes position information of each of the chunks, the size of each sample, the display duration of each sample and identification information indicating whether or not a sample is a random-accessible sample. The position information, the sample size, the sample display duration and the sample identification information are each a setting to be recorded on the optical disk 2 as a setting relative to a reference, which is described in the tfhd atom for the block as a standard setting. On the other hand, management information for the head block of the real data is included in the initial moov atom for every chunk associated with the initial moov atom and each of samples included in every chunk as settings, which are to be recorded on the optical disk 2 as settings corresponding to the standard settings described in the aforementioned tfhd atom of every moof atom. That is to say, a result of image pickup is recorded onto the optical disk 2 as a fragment movie file including blocks of real data and pieces of management information associated with the blocks.

Thus, in the video-disc apparatus 1, even if an operation to take an image can no longer be continued due to typically a failure occurring in the course of the image pickup operation, a result of the image pickup operation carried out so far can be recorded on the optical disk 2 as data that can be reproduced from the optical disk 2.

In a process to reproduce an image pickup result recorded on the optical disk 2 as described above, however, the processing of the process must be switched from the initial moov atom to a moof atom in order to acquire management information recorded in these atoms as management information required in the reproduction process. In order to solve this problem of this process switching, when the user enters an instruction to start a process to reproduce an image pickup result recorded on the optical disk 2, the video-disc apparatus 1 starts a process to reproduce a fragment movie file containing the result of image pickup from the optical disk 2. In the process to reproduce the fragment movie file from the optical disk 2, first of all, the initial moov atom is reproduced and the management information included in the initial moov atom is held in an embedded memory. Then, on the basis of the management information held in the embedded memory as the management information set in the initial moov atom, a movie data atom associated with the initial moov atom is reproduced from the optical disk 2 and presented to the user. During a free time period in an access to the optical disk 2 to reproduce this movie data atom, the following moof atom is reproduced from the optical disk 2. The video-disc apparatus 1 then modifies the management information included in the moof atom reproduced in this way on the basis of standard settings set in the moof atom to management information compatible with management information held in the embedded memory as management information set in the initial moov atom, and adds the modified management information to the management information held in the embedded memory.

Even after the management information set in the moof atom is acquired in this way, the video-disc apparatus 1 concurrently carries out a process to reproduce a movie data atom associated with the acquired moof atom, a process to reproduce the next moof atom, a process to modify management medium included in the next moof atom to management information compatible with the settings in the initial moov atom and a process to add the modified management information to the settings stored in the embedded memory as the settings in the initial moov atom at the same time. Thus, while the fragment movie file is being reproduced from the optical disk 2, the management information set in all moof atoms set in the fragment movie file is modified to management information compatible with the settings in the initial moov atom.

As a result, in the video-disc apparatus 1, the system control microcomputer 19 bears a heavier processing load only temporarily when a fragment movie file is reproduced for the first time. This is because any subsequent process to reproduce the same fragment movie file can be carried out without switching the processing from the initial moov atom to a moof atom. The elimination of the need to switch the processing simplifies the process to reproduce the fragment movie file. In addition, a process to reproduce the fragment movie file between an operation to modify settings of all moof atoms and an operation to store the modified settings in an embedded memory (that is, a process to reproduce real data left in the fragment movie file as real data associated with a range of the stored modified settings) can be carried out without switching the processing from the initial moov atom to a moof atom. Thus, by the same token, the elimination of the need to switch the processing simplifies the process to reproduce the fragment movie file.

As described above, real data recorded on the optical disk 2 is reproduced on the basis of management information stored in the embedded memory. Thus, much like a process to reproduce an ordinary QT movie file, samples of each movie data atom of the fragment movie file can be reproduced sequentially along the time axis. In addition, in accordance with identification information included in management information held in the embedded memory for a sample as identification information used for indicating whether or not the sample is a random-accessible sample, samples each included in a movie data atom as a sample containing real data can be reproduced selectively. Thus, the fragment movie file can be reproduced at a variable speed.

If the storage capacity of the embedded memory is not large enough for storing the modified management information set in all moof atoms in the same format as the initial moov atom, the video-disc apparatus 1 allocates a work area of the optical disk 2 to the modified management information to compensate the embedded memory for the insufficiency. Thus, even in the case of a fragment movie file obtained as a result of a long recording process and even in the case of a memory embedded in the system control microcomputer 19 as a memory with a small storage capacity, the management information included in moof atoms of the fragment movie file can be modified to management information compatible with settings in the initial moov atom of the same file with a high degree of reliability.

Then, the management information set in all moof atoms is acquired in the same format as the settings in the initial moov atom and temporarily recorded in the work area allocated in the optical disk 2. As the process to reproduce the fragment temporary file is completed, the management information held in the allocated work area is used for recording a QT movie file with an external reference format onto the optical disk 2. Then, by modifying the file name, the QT movie file can be used as a substitute for the fragment movie file.

Thus, once management information set in the moof atoms has been modified to a format compatible with the initial moov atom, the video-disc apparatus 1 is capable of effectively utilizing the management information included in the modified moof atoms to reproduce the fragment movie file in any subsequent process. In any subsequent process to reproduce the fragment movie file, the moof atoms no longer need to be modified. Instead, by carrying out the same process as a process to reproduce an ordinary QT movie file, movie data atoms of the fragment movie file can be reproduced.

(3) Effects of the Embodiment

In accordance with the embodiment described above, management information set in blocks following the head block is modified to management information compatible with management information set in the head block in a process to reproduce real data of the blocks. It is thus possible to simplify the process to reproduce a fragment movie file or the like containing the real data.

To put it more concretely, in this case, the real data is video data and the management data for managing reproduction of the real data is provided for each sample, which corresponds to a frame of the video data. Thus, the present invention can be applied to reproduction of typically a fragment movie file, which has the ISO base media file format taking the QT movie file format as a base, in order to make the processing of the reproduction process simple.

In addition, the management information includes identification information provided for a sample as information indicating whether or not the sample is a random-accessible sample. Thus, on the basis of the identification information kept in the modified management information, the real data can be selectively reproduced. As a result, by carrying out a simple process in the same way as the process to reproduce an ordinary QT file, the real data can be reproduced at a variable speed.

On top of that, the management information includes position information corresponding to a reproduction time of the real data. Thus, on the basis of the position information kept in the modified management information, a process to reproduce the real data can be started. As a result, by carrying out a simple process in the same way as the process to reproduce an ordinary QT file, the process to reproduce the real data can be commenced at a reproduction time identified by the position information.

The management information modified as described above is recorded onto an optical disk serving as a recording medium. Then, on the basis of the modified management information recorded on the recording medium, a file having an external reference format is created on the recording medium as a file, which references the real data of the fragment movie file. Thus, subsequent processes to reproduce the real data can be made simple. In addition, the fragment movie file can be converted into a file reproducible in a reproduction apparatus having no function to reproduce a fragment movie file.

(4) Second Embodiment

Figure 8:
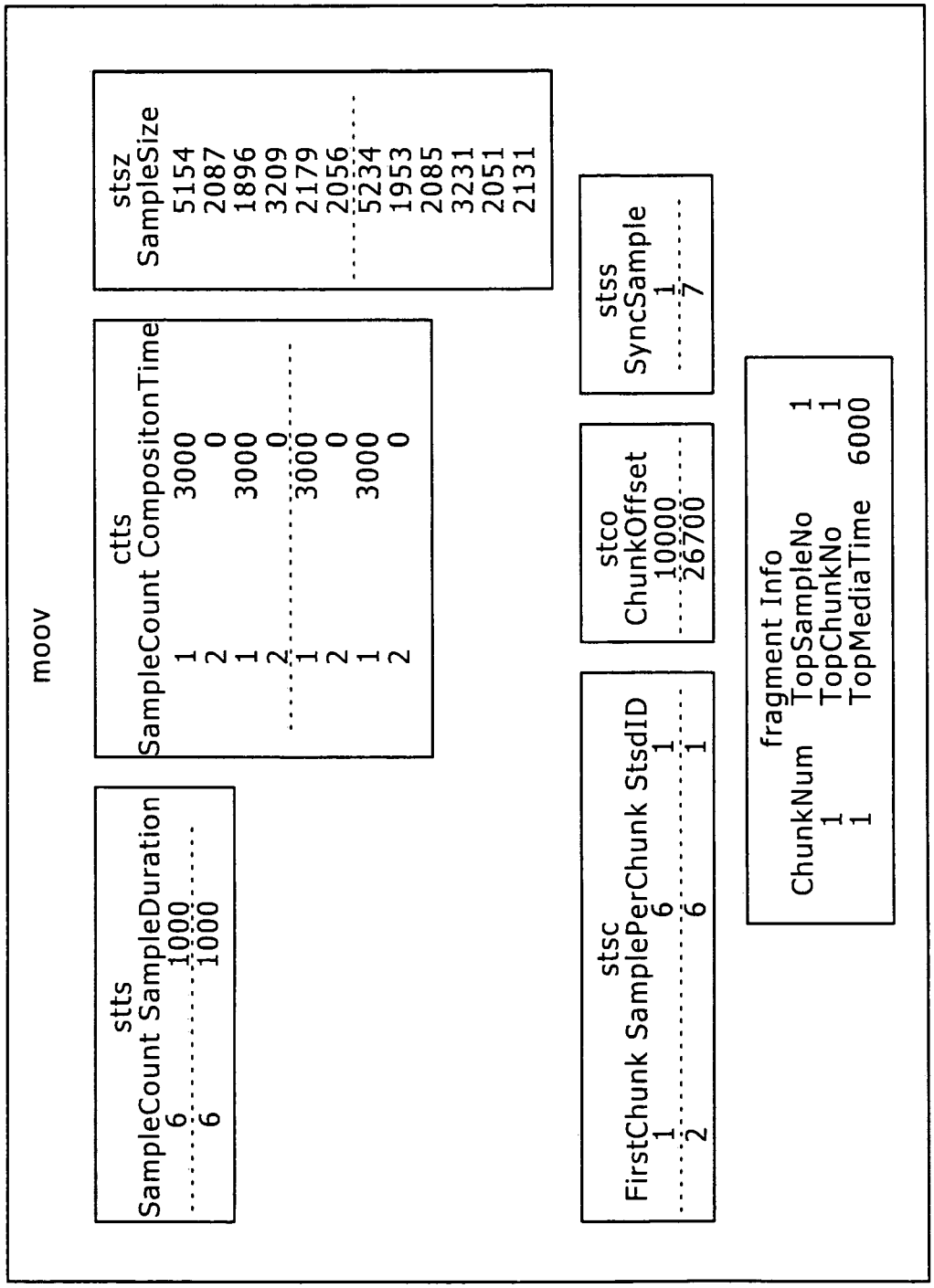
FIG. 8 is a table referred to in explaining processing of management information according to a second embodiment of the present invention.

FIG. 8 is a table referred to in comparison with the table shown in FIG. 7 in explaining processing of management information used in accordance with a second embodiment of the present invention. A video-disk apparatus according to the second embodiment has a configuration identical with the configuration of the video-disc apparatus 1 according to the first embodiment except that the second embodiment has management-information processing different from that of the first embodiment. For this reason, the second embodiment can be described by referring to the configuration shown in FIG. 2 as follows.

In this embodiment, the system control microcomputer 19 is designed as a microcomputer having an embedded memory with a small storage capacity. Also in the case of this embodiment, management information set in moof atoms is modified to information compatible with the initial moov atom. However, modified management information for only a plurality of blocks can be stored in the embedded memory having a small storage capacity as described above. Thus, the modified management information set in moof atoms is stored in the embedded memory in a format shown in FIG. 8. This format allows management information to be deleted from the embedded memory at the end of the reproduction process so as to preserve a memory area occupied by the deleted-management information as a free memory area. The deleted management information is management information no longer required after completion of a process to reproduce the block data associated with the management information. Then, management information associated with the next moof atom as management information to follow management information left in the embedded memory as management information for the initial moov atom is modified to information compatible with settings in the initial moov atom and recorded in the preserved free memory area. In this way, the video-disc apparatus 1 is capable of reproducing a fragment movie file by carrying out a simple process even if the storage capacity of the embedded memory is extremely small in comparison with the size of the fragment movie file.

In addition, in the case, the system control microcomputer 19 carries out a process to delete management information from the embedded memory in block units each corresponding to a movie data atom in order to make management of the embedded memory simple. In order to allow management information to be deleted from the embedded memory in block units by carrying out a simple process, modified management information is also recorded into the memory in block units.

That is to say, the system control microcomputer 19 records a sample count and a sample duration in an stts atom for each block in the embedded memory as shown in FIG. 8 and FIG. 7, which is given in this case a figure to be compared with FIG. 8. The chunk offset serving as information on the position of the head chunk of a block is also recorded in the stco atom for each block.

Since some management information is information related to a sample or some samples of a chunk pertaining to a block, recorded sample information includes boundary information showing a boundary between blocks. Thus, management of block units can be made simple. The system control microcomputer 19 records this boundary information in fragment info showing a chunk count (Chunk Num) representing the number of chunks included in each block. That is to say, in the case of an example shown in FIG. 8, every block includes only one chunk. Thus, the sample counts provided for two blocks in the stts atom show that every block consists of six samples. The ctts atom includes sample counts and composition times. In this ctts atom, a sample-count sum of six provides a boundary between two adjacent blocks as shown by a dashed line. By the same token, the stsz atom includes sample sizes and a set of six sample sizes is separated from another set by a boundary between blocks as shown by a dashed line. In the same way, the stss atom includes a sample number assigned to each sync sample as information indicating which sample is a random-accessible sample. These numbers assigned to sync samples are also separated from each other by a boundary between blocks as shown by a dashed line.

In addition, as shown in FIG. 9 in comparison with FIG. 8, each time a process to reproduce management information for a block is completed in the course of the processing to reproduce real data, the system control microcomputer 19 deletes management information associated with the block and records the next management information modified to management information compatible with the settings of the initial moov atom into the embedded memory as additional management information following the remaining management information left in the embedded memory. In order to reflect the fact that the management information associated with the block has been deleted from the embedded memory and the additional management information has been newly recorded in the embedded memory, the information on a boundary between blocks in the fragment info is updated.

As described above, the fragment info set by the system control microcomputer 19 is information used for identifying blocks, the management information set in which is held in the embedded memory in the management of block units. To put it concretely, for each block, the management information set in which is held in the embedded memory, the fragment info set by the system control microcomputer 19 includes the number of the top chunk in the block and the number of the top sample in the top chunk in addition to a top media time representing the display time of the head block.

Thus, since the system control microcomputer 19 manages pieces of management information in block units as described above, the system control microcomputer 19 is capable of identifying the present positions of the pieces of management information in the embedded memory with ease. On the basis of management information at the present positions, the system control microcomputer 19 is capable of carrying out processing such as a process of skipping to a reproduction position specified by the user and, in addition, capable of carrying out the so-called post-rewind reproduction processing.

Figures 10A, 10B:
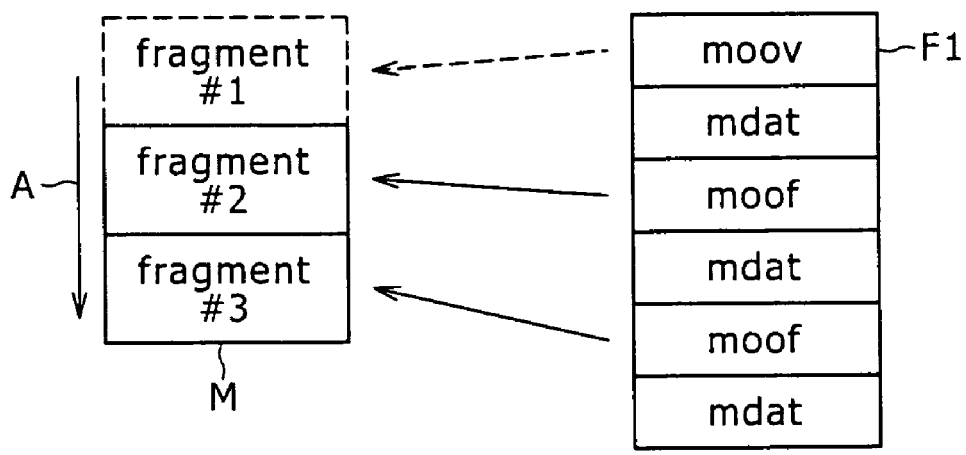
FIGS. 10A and 10B are diagrams referred to in explanation of processing to update contents of a memory at a reproduction time in the progressing direction along the time axis.
Figures 11A, 11B:
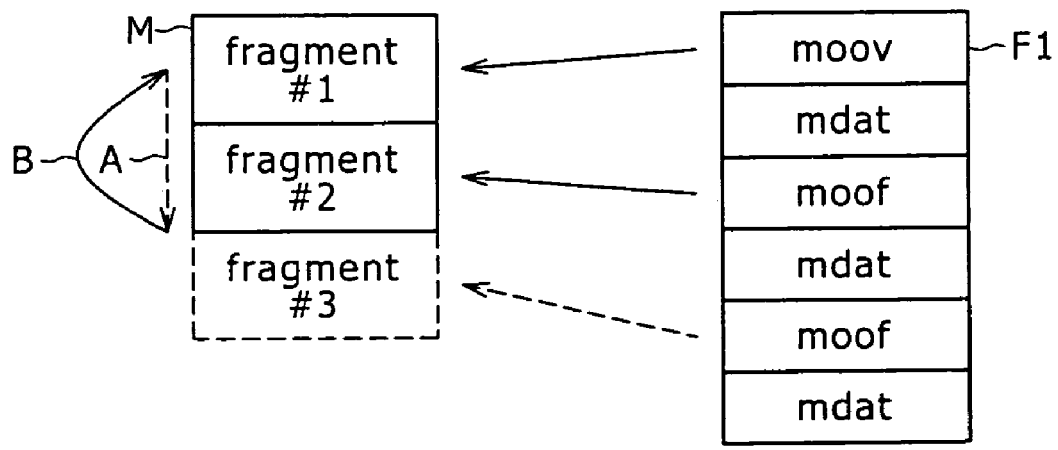
FIGS. 11A and 11B are diagrams referred to in explanation of processing to update contents of a memory in the event of a skip.

The so-called post-rewind reproduction processing is explained as follows. A fragment movie file F1 is reproduced sequentially in a direction shown by an arrow A in FIGS. 10A and 10B, starting with the management information associated with the first block shown as fragment #1 in the figure. In the case of an embedded memory M having a storage capacity for accommodating only two blocks, as the process to reproduce the management information associated with the first block is completed, the management information associated with the first block is deleted from the embedded memory M to result in a free area occupied so far by the deleted management information. Then, management information associated with the third block is stored in the free area. Then, if the processing to reproduce the fragment movie file F1 is returned to the reproduction position corresponding to the first block as shown by an arrow B in FIGS. 11A and 11B with the management information set in the third block left in the embedded memory M as it is, however, the management information once stored in the embedded memory M as the management information associated with the third block is deleted from the memory M and the management information associated with the first block is stored back in the embedded memory M. In this case, the management information associated with the first block is the management information included in the initial moov atom. Then, in accordance with the management information stored back in the embedded memory M, the first block is reproduced. In this case, on the basis of the fragment information held in the embedded memory M, the system control microcomputer 19 is capable of identifying the first block and storing back the management information associated with the first block in the embedded memory M. In this way, processing carried out by the system control microcomputer 19 can be made simple. As described above, for each block, the management information set in which is held in the embedded memory, the fragment info includes the number of the top chunk in the block and the number of the top sample in the top chunk in addition to the top media time representing the display time of the first block.

Figure 12:
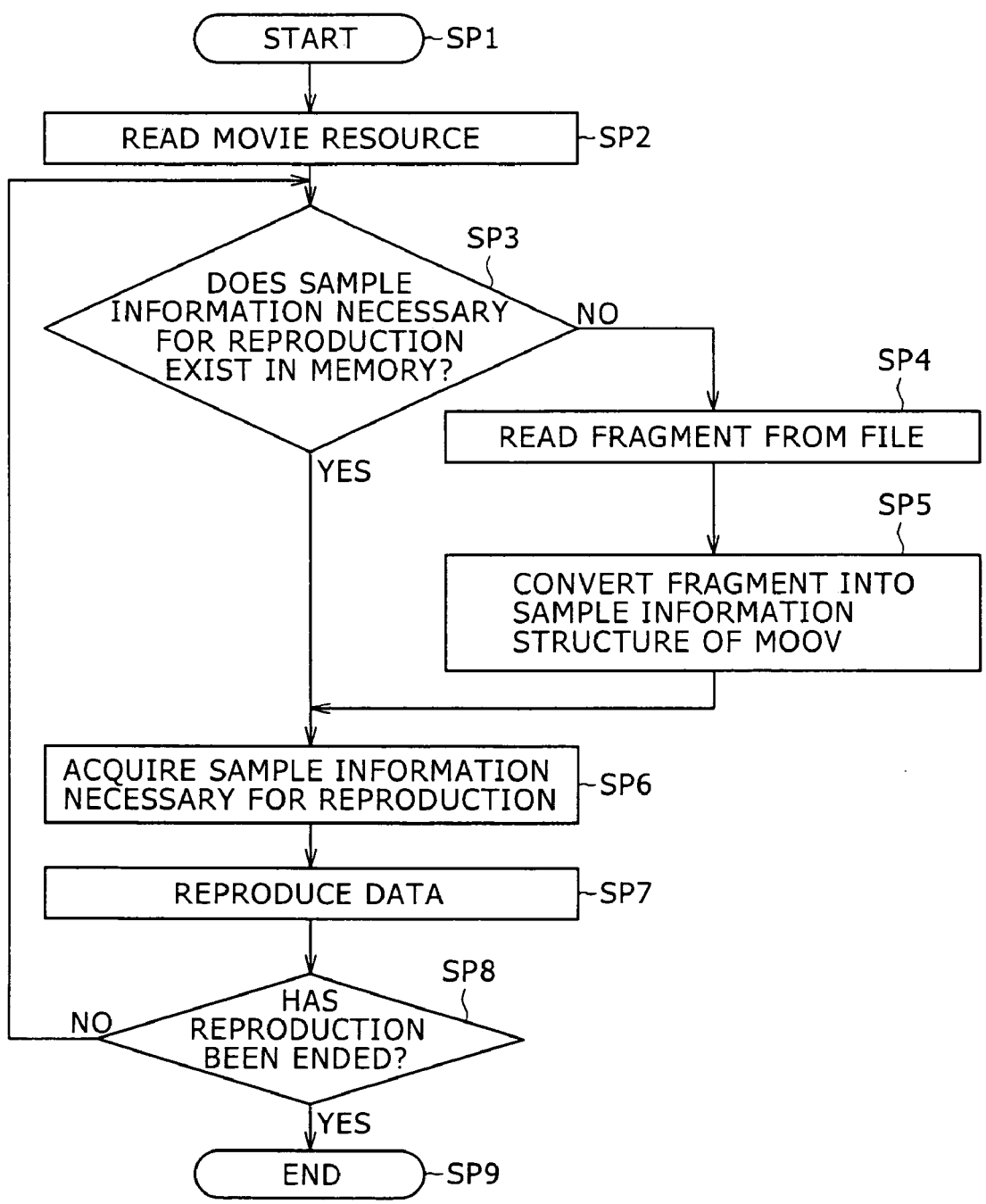
FIG. 12 shows a flowchart representing a processing procedure of a system control microcomputer 19 employed in a video-disc apparatus according to the second embodiment of the present invention.

FIG. 12 shows a flowchart representing a procedure executed by the system control microcomputer 19 as a procedure of processing to reproduce a fragment movie file. At a step SP1, the system control microcomputer 19 starts the processing procedure in accordance with an instruction received from the user as a command to reproduce the fragment movie file. Then, in this case, at the following step SP2, the system control microcomputer 19 reproduces the initial moov atom of the fragment movie file and stores the atom in the embedded memory as a movie resource. Subsequently, the flow of the processing goes on to the next step SP3 to produce a result of determination as to whether or not management information related to a reproduction location requested by the command issued by the user exists in the embedded memory in accordance with management information included in the movie resource stored in the embedded memory. If the result of the determination is a negation, the flow of the processing goes on from the step SP3 to a step SP4 at which the system control microcomputer 19 finds out the present position of the management information held in the embedded memory from the management information stored in the memory. Then, the system control microcomputer 19 detects the moof atom of a required block (or a required fragment) from the present position and reads out the moof atom from the optical disk 2. A process to detect the moof atom is carried out in accordance with the fragment info described above.

Subsequently, at the next step SP5, the system control microcomputer 19 modifies management information associated with the moof atom read out from the optical disk 2 to management information compatible with the structure of the initial moov atom and stores the modified management information in the embedded memory. Then, the flow of the processing goes on to a step SP6. If the determination result produced at the step SP3 is a confirmation, on the other hand, the flow of the processing goes on directly to the step SP6. At the step SP6, the system control microcomputer 19 acquires sample information required in the reproduction processing from the management information stored in the embedded memory. Then, at the next step SP7, real data is reproduced from the optical disk 2 in accordance with this management information. Subsequently, the flow of the processing goes on to the next step SP8 to produce a result of determination as to whether or not the user has instructed the system control microcomputer 19 to end the reproduction, or whether or not the tail of the fragment movie file has been reproduced. If the result of the determination is a negation revealing the fact that the reproduction processing has not been completed for some reasons, the flow of the processing goes back to the step SP3. At this and subsequent steps, the system control microcomputer 19 reads out sample information associated with the next sample from the embedded memory if the information has already been stored in the embedded memory. If the sample information is not found in the embedded memory, on the other hand, the system control microcomputer 19 reads out the information from the optical disk 2. In either case, the reproduction process is continued on the basis of the sample information. If the determination result produced at the step SP8 reveals the fact that the reproduction processing has been completed, on the other hand, the flow of the processing goes back to a step SP9 at which the system control microcomputer 19 ends the execution of the processing procedure.

In accordance with the configuration described above, real data is reproduced from the optical disk 2 in accordance with management information modified to information compatible with the management information set in the initial moov atom and stored in an embedded memory as management information associated with a plurality of blocks. In the reproduction processing, management information associated with a block completing a reproduction process is deleted from the embedded memory, and management information associated with a next block following the blocks is modified to information compatible with the management information set in the initial moov atom and stored in the embedded memory in a process of managing management information in block units. Thus, the processing to reproduce a fragment movie file can be made simple even if the embedded memory has only a small storage capacity.

In addition, by also storing boundary information showing the boundary between every two adjacent blocks in the embedded memory, it is also possible to simplify the process of managing management information in block units.

(5) Other Embodiments

In the embodiments described above, a block consists of a plurality of chunks. It is to be noted, however, that the scope of the present invention is not limited to the embodiments described above. For example, the present invention can also be applied to a broad range of applications in which a chunk is stretched over two blocks.

In addition, in the case of the second embodiment, management information held in the embedded memory is used only for reproduction of real data. It is to be noted, however, that the scope of the present invention is not limited to this second embodiment. For example, management information held in the embedded memory can also be used for creation of an ordinary QT movie file having the external reference format as is the case with the first embodiment.

In addition, in the case of the first embodiment, management information obtained at a reproduction time of a fragment movie file is also used for creation of a QT movie file having the external reference format and the QT movie file is used as a substitute for the fragment movie file. It is to be noted, however, that the scope of the present invention is not limited to this first embodiment. For example, in addition to the scheme according to the first embodiment or as a substitute for the scheme, typically at a spare time, the initial moov atom of the fragment movie file and moof atoms of the file are reproduced and used for creation of an ordinary QT movie file having the external reference format and the QT movie file is used as a substitute for the fragment movie file. Additionally, in this case, the fragment movie file may be reproduced till a middle point in the file and management information modified to information compatible with settings in the initial moov atom as management information associated with moof atoms reproduced so far may be used for creation of an ordinary QT movie file having the external reference format. In this way, the time it takes to carry out the work can be shortened.

In addition, the embodiments described above each implement a video-disk apparatus conforming to the formats of the QT file and ISO base media file. It is to be noted, however, that the scope of the present invention is not limited to these embodiments. For example, the present invention can also be applied to a broad range of apparatus for reproducing files each having a format identical with the structure of the QT movie file. The formats identical with the structure of the QT movie file are each a format based on the format of the QT movie file. Examples of the format based on the format of the QT movie file are the format a motion JPEG 2000 (MJ2) file and the format of an AVC (Advanced Video Coding: MPEG-4 part 10) file.

In addition, in each of the embodiments described, the present invention provides video-disk apparatus each used for recording a QT movie file and an ISO media file onto an optical disk serving as a recording medium. It is to be noted, however, that the scope of the present invention is not limited to these embodiments. For example, the present invention can also be applied to a broad range of applications in which a variety of recording mediums such as a magnetic disk and a memory card are used as the recording medium.

In addition, in each of the embodiments described, the present invention is applied to a video-disk apparatus. It is to be noted, however, that the scope of the present invention is not limited to these embodiments. For example, the present invention can also be applied to a broad range of apparatus including a portable telephone having a function for reproducing a moving picture, a PDA (Personal Digital Assistants), a variety of reproduction apparatus for reproducing a movie file obtained by means of wire and radio communications and a variety of editing apparatus such as personal computers for editing a movie file obtained as a result of image pickup.

INDUSTRIAL APPLICABILITY

The present invention can be applied to reproduction of a fragment movie file typically having an ISO base media file format.

The invention claimed is:

1. A file reproduction apparatus for reproducing a file recorded on a recording medium, comprising:
a file controller containing real data and management information used for reproducing said real data;
a management information unit that provides said management information for blocks composed of a first block and a sequence of subsequent blocks following said first bock as blocks of said real data;
wherein said management information associated with each of said subsequent blocks included in said real data as blocks other than said first block of said real data is provided as information including standard settings and at least some settings taking said standard settings as a reference;
wherein said management information associated with said first block of said real data is provided as settings corresponding to said standard settings, and
wherein said management information associated with each of said subsequent blocks is modified to settings compatible with said management information associated with said first block; and
a real data reproduction unit that reproduces real data on the basis of said modified management information.

2. The file reproduction apparatus according to claim 1, wherein:
said real data is video data and;
said management information is provided for each sample corresponding to a frame of said real data.

3. The file reproduction apparatus according to claim 2, wherein:
one piece of said management information provided for a sample is an identification showing that said sample is a random-accessible sample; and
on the basis of said identification included in said modified management information, said reproduction apparatus selectively reproduces said real data in order to reproduce said real data at a variable speed.

4. The file reproduction apparatus according to claim 2, wherein:
one piece of said management information is position information corresponding to a reproduction time of said real data; and
on the basis of said position information included in said modified management information, said reproduction apparatus starts a process to reproduce said real data in order to commence reproduction of said real data at a reproduction time indicated by said position information.

5. The file reproduction apparatus according to claim 1, wherein:
said modified management information associated with a plurality of said blocks is stored in a memory as information necessary for a process to reproduce said real data; and
said modified management information associated with a block already completing said process to reproduce said real data is deleted from said memory and management information associated with a next block following a plurality of said blocks is modified to settings compatible with said management information associated with said first block, being stored in said memory.

6. The file reproduction apparatus according to claim 5, wherein:
said modified management information associated with a plurality of said blocks includes boundary information stored in said memory as information showing boundaries between said blocks; and
said modified management information associated with a block already completing said process to reproduce said real data is deleted from said memory by taking said boundary information as a reference.

7. The file reproduction apparatus according to claim 1, wherein said modified management information is recorded onto said recording medium and used for creation of another file used for referencing said real data stored in said file as another file having an external reference format.

8. A file reproduction method for reproducing a file recorded on a recording medium, comprising:
reproducing real data wherein said file is a file containing real data and management information;
providing said management information for each of blocks composed of a first block and a sequence of subsequent blocks following said first bock as blocks of said real data;
providing said management information associated with each of said subsequent blocks included in said real data as blocks other than said first block of said real data as information including standard settings and at least some settings taking said standard settings as a reference;
providing said management information associated with said first block of said real data as settings corresponding to said standard settings;
modifying said management information associated with each of said subsequent blocks to settings compatible with said management information associated with said first block; and
reproducing said real data on the basis of said modified management information.

9. A recording medium used for storing a computer program product to be executed by a computer as a program implementing a file reproduction method for reproducing a file recorded on another recording medium by execution of a predetermined processing procedure, said computer program product comprising a computer readable medium including program code stored thereon, said program code being executable to perform operations comprising:
creating a file containing real data and management information used for reproducing said real data;
providing said management information for each of blocks composed of a first block and a sequence of subsequent blocks following said first bock as blocks of said real data;
providing said management information associated with each of said subsequent blocks included in said real data as blocks other than said first block of said real data as information including standard settings and at least some settings taking said standard settings as a reference; and providing said management information associated with said first block of said real data as settings corresponding to said standard settings; and modifying said management information associated with each of said subsequent blocks to settings compatible with said management information associated with said first block, reproducing said real data on the basis of said modified management information.

* * * * *